US011157338B2

(12) United States Patent
Rodean et al.

(10) Patent No.: US 11,157,338 B2
(45) Date of Patent: Oct. 26, 2021

(54) THROTTLING USING MESSAGE PARTITIONING AND BUFFERING

(71) Applicant: International Business Machines Corporation, Armonk, NY (US)

(72) Inventors: Liviu Rodean, Hillard, OH (US); Tyler Wilgenbusch, Dublin, OH (US); Charles Patton Giles, Blacklick, OH (US); Vincent Tkac, Delaware, OH (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/669,410

(22) Filed: Oct. 30, 2019

(65) Prior Publication Data

US 2021/0133008 A1    May 6, 2021

(51) Int. Cl.
*G06F 9/54* (2006.01)
*H04L 29/08* (2006.01)
*G06F 9/50* (2006.01)

(52) U.S. Cl.
CPC ............ *G06F 9/546* (2013.01); *G06F 9/5061* (2013.01); *G06F 9/544* (2013.01); *H04L 67/1097* (2013.01); *H04L 67/306* (2013.01)

(58) Field of Classification Search
None
See application file for complete search history.

(56) References Cited

U.S. PATENT DOCUMENTS

| 8,914,684 B2 | 12/2014 | Cota-Robles et al. |
| 9,124,536 B2 | 9/2015 | DeCusatis et al. |
| 9,141,447 B2 | 9/2015 | Sigalov et al. |
| 9,424,077 B2 | 8/2016 | Geng et al. |

(Continued)

FOREIGN PATENT DOCUMENTS

| CN | 104717137 B | 2/2018 |
| EP | 3167369 A1 | 5/2017 |

OTHER PUBLICATIONS

Mell et al., "Effectively and Securely Using the Cloud Computing Paradigm" dated Oct. 7, 2009, NIST, Information Technology Laboratory, Total 80 pages.

(Continued)

*Primary Examiner* — Craig C Dorais
(74) *Attorney, Agent, or Firm* — Konrad, Raynes, Davda and Victor LLP; Janaki K. Davda

(57) ABSTRACT

Provided are techniques for throttling using message partitioning and buffering. A plurality of messages are stored in an input topics buffer, where the input topics buffer is stored in a plurality of partitions, and where each of the partitions of the plurality of partitions is associated with a tenant subgroup of a plurality of tenant subgroups of a tenant. A message of the plurality of messages from the tenant subgroup of the tenant is selected. A throttle count for the tenant subgroup is retrieved. A maximum message threshold for the tenant is retrieved. In response to determining that the throttle count is less than the maximum message threshold, the message is moved from the input topics buffer to a work topics buffer. In response to determining that the throttle count is equal to or greater than the maximum message threshold, throttling the tenant subgroup.

15 Claims, 10 Drawing Sheets

(56) References Cited

U.S. PATENT DOCUMENTS

| | | | |
|---|---|---|---|
| 9,692,696 | B2 | 6/2017 | DeCusatis et al. |
| 10,084,866 | B1 | 9/2018 | Yamanoha et al. |
| 10,268,414 | B2 | 4/2019 | Parra |
| 10,284,486 | B2 | 5/2019 | Thyagarajan et al. |
| 2013/0332414 | A1* | 12/2013 | Frerking ............... G06F 16/178 707/613 |
| 2013/0346533 | A1* | 12/2013 | Agrawal ............. H04L 29/0854 709/213 |
| 2015/0172075 | A1 | 6/2015 | DeCusatis et al. |
| 2015/0172183 | A1 | 6/2015 | DeCusatis et al. |
| 2016/0014038 | A1 | 1/2016 | Thyagarajan et al. |
| 2017/0286166 | A1 | 10/2017 | Yang et al. |
| 2019/0215279 | A1 | 7/2019 | Thyagarajan et al. |

OTHER PUBLICATIONS

Mell et al. "The NIST Definition of Cloud Computing" dated Sep. 2011, Computer Security Division Information Technology Laboratory National Institute of Standards and Technology, Total 7 pages.

Calder et al., "Windows Azure Storage—A Highly Available Cloud Storage Service with Strong Consistency", created 2012, Total 40 pages.

Calder et al., "Windows Azure Storage—A Highly Available Cloud Storage Service with Strong Consistency", dated Oct. 2011, In Proceedings of the Twenty-Third ACM Symposium on Operating Systems Principles, Total 15 pp.

Mace et al., "Retro: Targeted Resource Management in Multi-tenant Distributed Systems" dated May 4-6, 2015, In 12th USENIX Symposium on Networked Systems Design and Implementation (NSDI 2015), (online) retrieved from the Internet at URL>https://www.usenix.org/conference/nsdi15/technical-sessions/presentation/mace, Total 16 pages.

* cited by examiner

THROTTLING USING MESSAGE PARTITIONING AND BUFFERING

BACKGROUND

Embodiments of the invention relate to throttling using message partitioning and buffering. In particular, embodiments of the invention relate to mitigating noisy neighbor occurrences by throttling using message partitioning and buffering.

In a multi-tenant cloud infrastructure, tenants (e.g., customers or businesses) share resources of the cloud infrastructure, and each tenant's data is isolated (i.e., visible to the tenant but not to other tenants). A noisy neighbor may be described as a tenant in a cloud infrastructure that uses a large amount of resources (e.g., bandwidth, disk Input/Output (I/O), and processor time), and this may impact performance for another tenant in the cloud infrastructure.

SUMMARY

In accordance with embodiments, a computer-implemented method is provided for throttling using message partitioning and buffering. The computer-implemented method comprises operations. A plurality of messages are stored in an input topics buffer, where the input topics buffer is stored in a plurality of partitions, and where each of the partitions of the plurality of partitions is associated with a tenant subgroup of a plurality of tenant subgroups of a tenant. A message of the plurality of messages from the tenant subgroup of the tenant is selected. A throttle count for the tenant subgroup is retrieved. A maximum message threshold for the tenant is retrieved. In response to determining that the throttle count is less than the maximum message threshold, the message is moved from the input topics buffer to a work topics buffer. In response to determining that the throttle count is equal to or greater than the maximum message threshold, throttling the tenant subgroup.

In accordance with other embodiments, a computer program product is provided for throttling using message partitioning and buffering. The computer program product comprises a computer readable storage medium having program code embodied therewith, the program code executable by at least one processor to perform operations. A plurality of messages are stored in an input topics buffer, where the input topics buffer is stored in a plurality of partitions, and where each of the partitions of the plurality of partitions is associated with a tenant subgroup of a plurality of tenant subgroups of a tenant. A message of the plurality of messages from the tenant subgroup of the tenant is selected. A throttle count for the tenant subgroup is retrieved. A maximum message threshold for the tenant is retrieved. In response to determining that the throttle count is less than the maximum message threshold, the message is moved from the input topics buffer to a work topics buffer. In response to determining that the throttle count is equal to or greater than the maximum message threshold, throttling the tenant subgroup.

In yet other embodiments, a computer system is provided for throttling using message partitioning and buffering. The computer system comprises one or more processors, one or more computer-readable memories and one or more computer-readable, tangible storage devices; and program instructions, stored on at least one of the one or more computer-readable, tangible storage devices for execution by at least one of the one or more processors via at least one of the one or more memories, to perform operations. A plurality of messages are stored in an input topics buffer, where the input topics buffer is stored in a plurality of partitions, and where each of the partitions of the plurality of partitions is associated with a tenant subgroup of a plurality of tenant subgroups of a tenant. A message of the plurality of messages from the tenant subgroup of the tenant is selected. A throttle count for the tenant subgroup is retrieved. A maximum message threshold for the tenant is retrieved. In response to determining that the throttle count is less than the maximum message threshold, the message is moved from the input topics buffer to a work topics buffer. In response to determining that the throttle count is equal to or greater than the maximum message threshold, throttling the tenant subgroup.

BRIEF DESCRIPTION OF THE SEVERAL VIEWS OF THE DRAWINGS

Referring now to the drawings in which like reference numbers represent corresponding parts throughout.

DETAILED DESCRIPTION

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Cloud service providers provide services to multiple tenants in a cloud infrastructure. Embodiments enable the cloud service providers to process customer data of the multiple tenants in parallel and on time, while allocating resources more evenly amount the multiple tenants.

Figure 1:
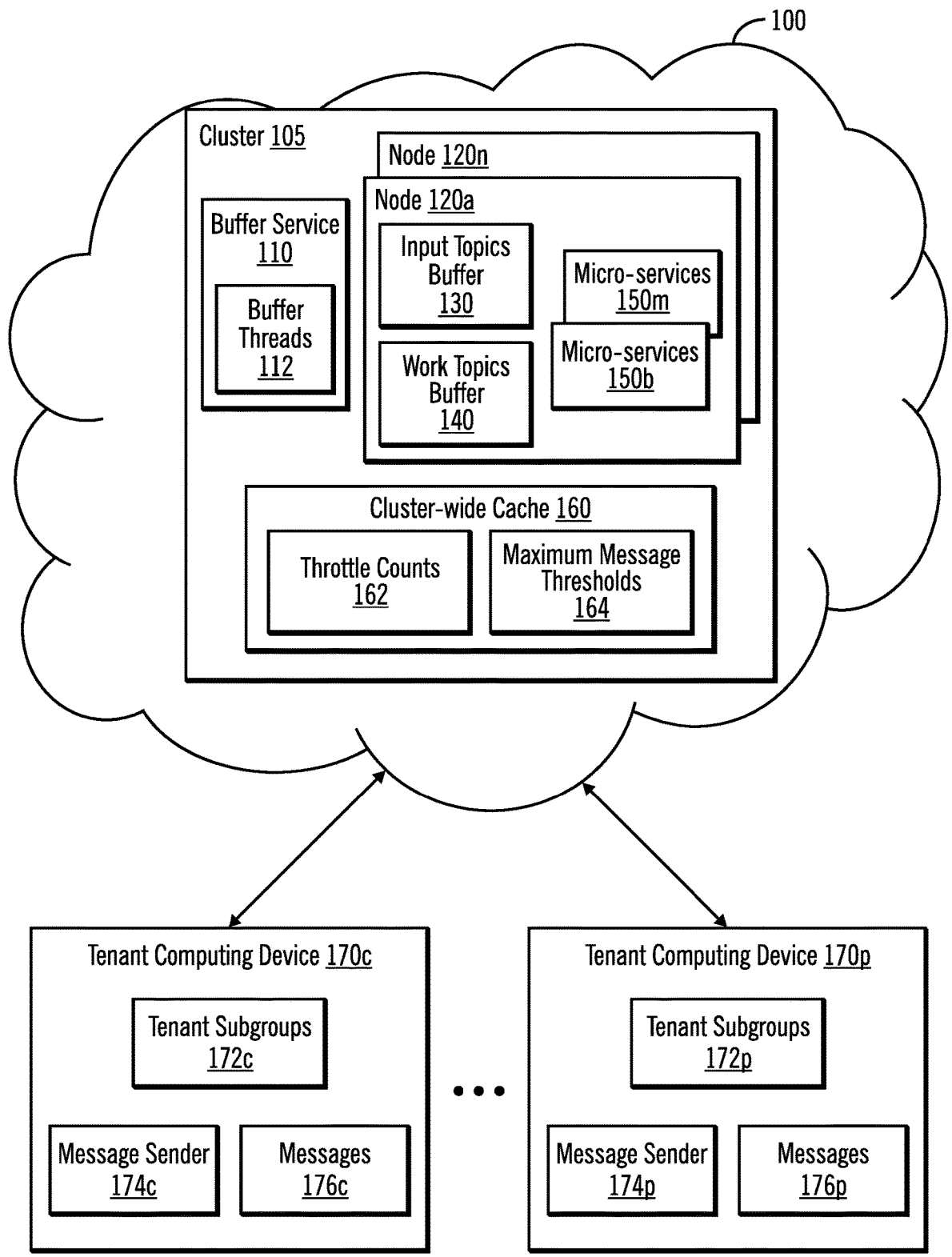
FIG. 1 illustrates, in a block diagram, a computing environment in accordance with certain embodiments.

FIG. 1 illustrates, in a block diagram, a computing environment in accordance with certain embodiments. A cluster 105 is part of a cloud infrastructure 100. The cluster 105 includes a buffer service 110, nodes 120a . . . 120n, and a cluster-wide cache 160. The buffer service 110 includes buffer threads 112. In certain embodiments, the buffer service 110 is a type of micro-service.

Each of the nodes 120a . . . 120n includes an input topics buffer, a work topics buffer, and micro-services. For example, node 120a includes the input topics buffer 130, the work topics buffer 140, and micro-services 150b . . . 150m. In certain embodiments, there is one input topics buffer 130 for each micro-service, and, in other embodiments, there is one input topics buffer 130 for multiple micro-services. In certain embodiments, there is one work topics buffer 130 per tenant.

In certain embodiments, the input topics buffer 130 is a queue, and portions of the queue are on different partitions. In certain embodiments, the work topics buffer 140 is a queue, and portions of the queue are on different partitions. In certain embodiments, a tenant subgroup is associated with one or more of the partitions so that the messages for each tenant subgroup are stored in the associated one or more partitions. A tenant subgroup may also be referred to as a tenant subgroup, a tenant subdivision or a tenant business. In certain embodiments, a set of micro-services (e.g., micro-services 150b) may be described as components of an application that perform processing of messages for that application.

The cluster-wide cache 160 stores throttle counts 162 and maximum message thresholds 164. In certain embodiments, each of the throttle counts 162 is associated with a tenant subgroup. Each of the throttle counts 162 represents a number of messages actively being processed by one or more tenant subgroups of a tenant. Each of the maximum message thresholds 164 is for messages cluster-wide for a tenant, and there may be different maximum message thresholds 164 for different tenants. Tenant computing devices 170c . . . 170p each have tenant subgroups 172c . . . 172p that use a message system 174c . . . 174p to send messages 176c . . . 176p to the cloud cluster 100 via any type of network. A tenant subgroup may be described as a subdivision of a tenant. For example, one tenant may have subgroups of: accounting division, shipping division, etc.

In certain embodiments, each of the buffer threads 112 is assigned to one or more partitions storing portions of the input topics buffer 130. Each of the buffer threads 112 iterates through each assigned partition and processes messages in the order they arrived in that partition, before moving on to the next partition. In embodiments in which each of the buffer threads 112 is assigned to one partition, when the throttle count 162 for a tenant subgroup equals or exceeds the maximum message threshold 164 for that tenant, then the buffer thread 112 waits until the throttle count 162 is decremented. In embodiments in which there each of the buffer threads 112 is assigned to multiple partitions, when the throttle count 162 for a tenant subgroup equals or exceeds the maximum message threshold 164 for that tenant, the buffer thread 112 switches to processing another partition assigned to another tenant.

In certain embodiments, each of the micro-services 150b . . . 150m is assigned to one or more partitions of the work topics buffer 140. Each of the micro-services 150b . . . 150m iterates through each assigned partition and processes messages in the order they arrived in that partition, before moving on to the next partition. If there are no messages to be processed in the assigned one or more partitions, the micro-service 150b . . . 150m waits for a message.

Figure 2:
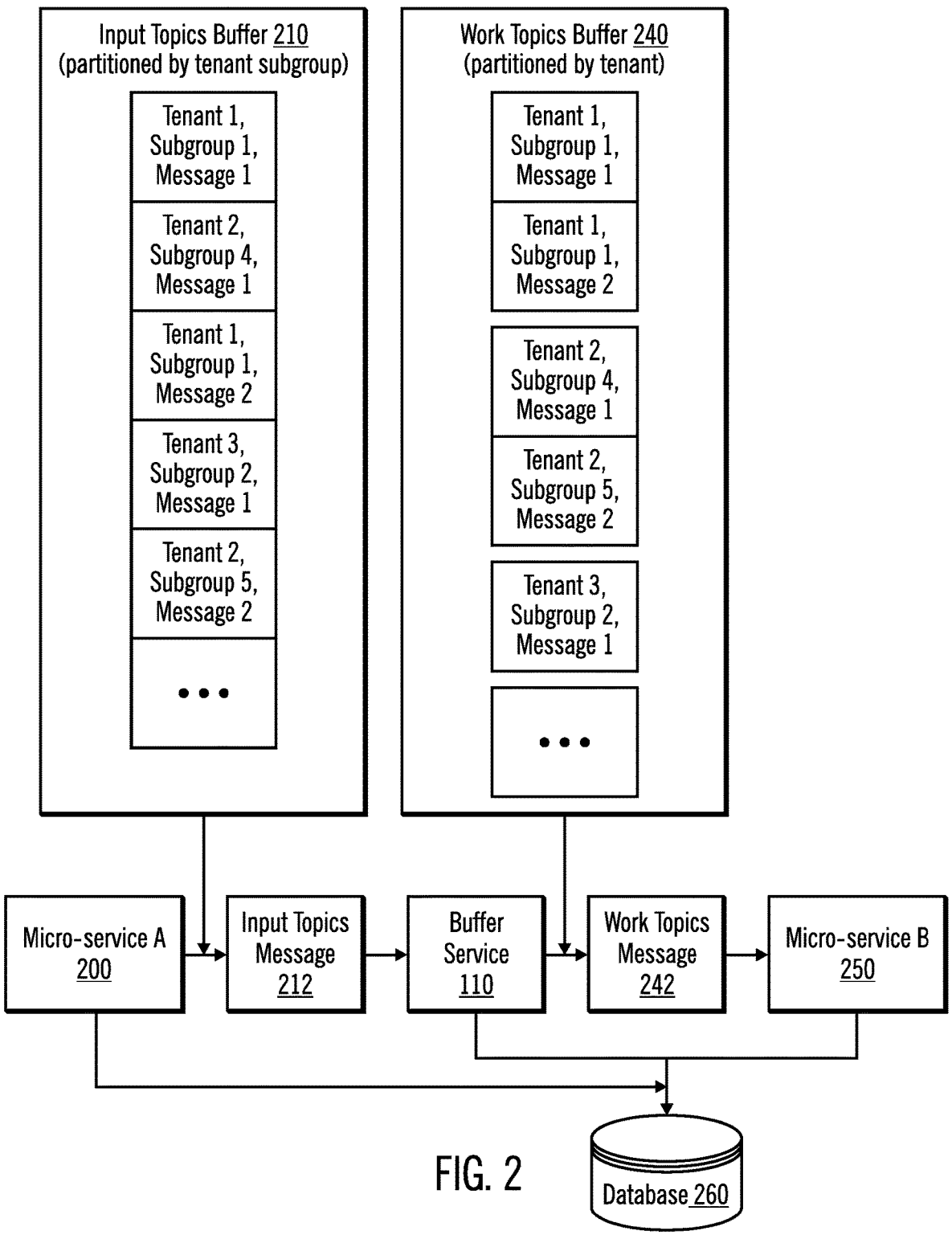
FIG. 2 illustrates a flow of processing in accordance with certain embodiments.

FIG. 2 illustrates a flow of processing in accordance with certain embodiments. The input topics buffer 210 is partitioned by tenant subgroup (rather than by tenant), with tenant messages stored in the order received. For example, the messages in the input topics buffer 210 are partitioned as follows:

Tenant 1, subgroup 1, message 1 is stored in a first partition
Tenant 2, subgroup 4, message 1 is stored in a second partition
Tenant 1, subgroup 1, message 2 is stored in the first partition
Tenant 3, subgroup 2, message 1 is stored in a third partition
Tenant 2, subgroup 5, message 2 is stored in a fourth partition The work topics buffer 240 may be partitioned in any manner. In certain embodiments, the work topics buffer 240 is partitioned by tenant (rather than tenant subgroup), so that messages are stored in one or more partitions associated with the tenant who sent the messages. Although the messages of Tenant 1 and Tenant 2 are not partitioned together in the input topics buffer 210, the work topics buffer 240 shows the messages of each Tenant partitioned together. For example, the messages in the work topics buffer 240 are partitioned as follows:

Tenant 1, subgroup 1, message 1 and Tenant 1, subgroup 1, message 2 are stored in a first partition
Tenant 2, subgroup 4, message 1 and Tenant 2, subgroup 5, message 2 are stored in a second partition
Tenant 3, subgroup 2, message 1 is stored in a third partition In other embodiments, the work topics buffer 240 may be partitioned based on a hash, etc. The micro-services 150b . . . 150m are able to process all messages as the messages are placed into the work topics buffer 240 when the throttle count 162 is less than the maximum message threshold 164.

In FIG. 2, either micro-service A 200 or an input topics buffer 210 provides an input topics message 212 to the buffer service 110. The buffer service 110 stores the input topics message 212 into a partition of the work topics buffer 240 based on a tenant subgroup associated with the message. Then, the micro-service B 250 retrieves a work topics message 242 from the work topics buffer 240. Thus, an input topics message 212 may be stored in an input topics buffer 210, and, when that message 212 is moved to the work topics buffer 240, the message may be referred to as a work topics message 242.

Each micro-service 200, 250 uses the database 260 to insert information about the messages it processes, while allowing for de-duplication logic. If the micro-service 250 fails to process a message, the transaction rolls-back, resulting in the message being placed back in the work topics buffer 240. Upon retrieving the message again, part or all the processing may be skipped, based on the information previously stored in the database 260.

Figure 3:
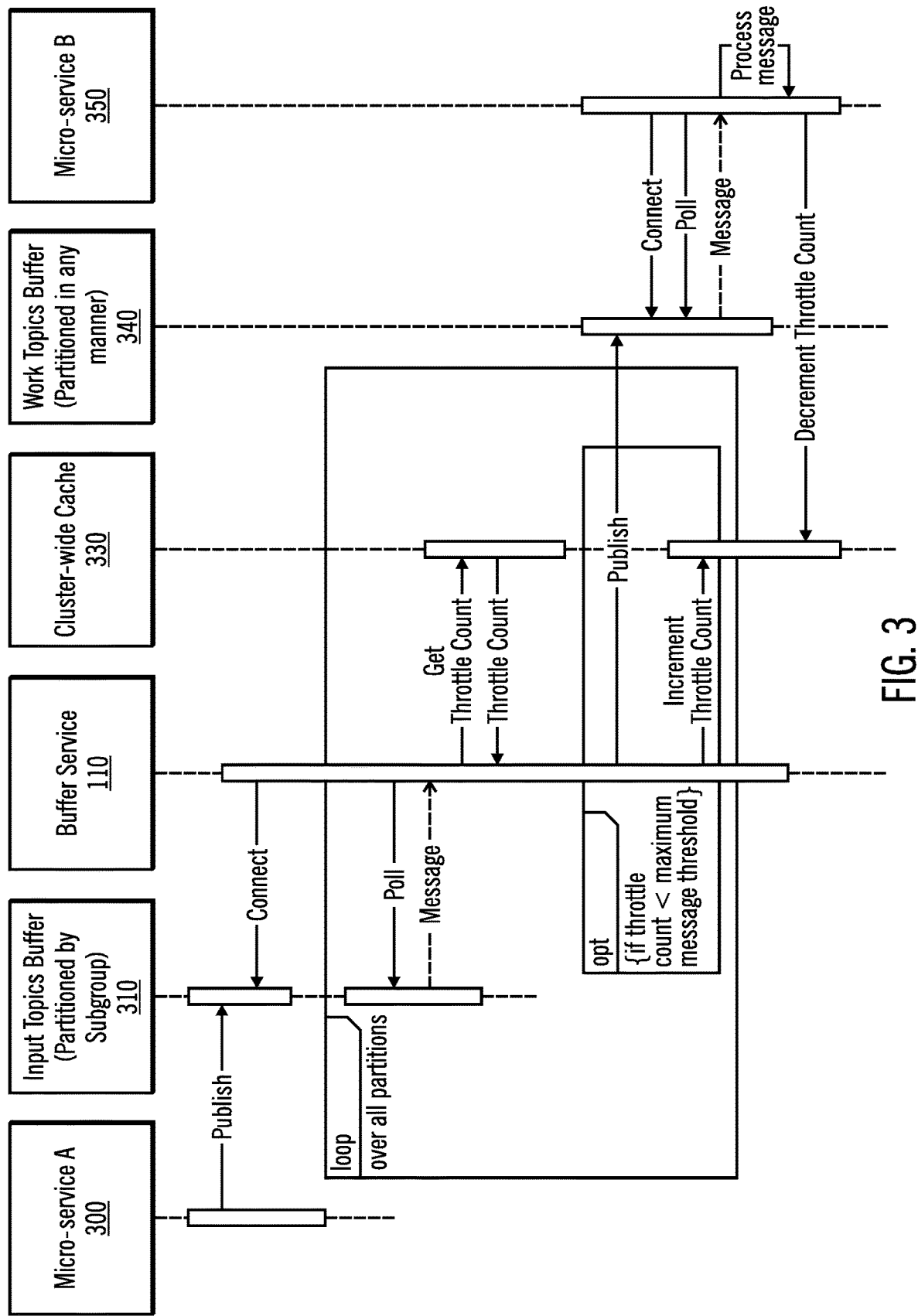
FIG. 3 illustrates a detailed flow of processing in accordance with certain embodiments.

FIG. 3 illustrates a detailed flow of processing in accordance with certain embodiments. Micro-service A 100 publishes (stores) a message into the input topics buffer 310. With embodiments, both tenant subgroups and micro-services may publish messages to the input topics buffer 310. The input topics buffer 310 is partitioned by tenant subgroup. The buffer service 110 (via a buffer thread 112) connects to the input topics buffer 310. Connecting may be described as acquiring a connection to the input topics buffer 310. The buffer service 110 polls the input topics buffer 310 periodically to determine whether there is a new message to be processed.

If a new message is available, the buffer service 110 retrieves a message from the input topics buffer. In certain embodiments, the message includes a message key and the message payload. The message may take the form of a key-value pair, where the message key specifies a tenant subgroup identifier for the tenant subgroup, and the value specifies the content ("payload") of the message to be processed. In other embodiments, the message key may specify the tenant subgroup identifier and the tenant identifier of the tenant, along with the content. The buffer service 110 obtains a throttle count from the cluster-wide cache 330 for the tenant subgroup. If the throttle count (i.e., number of messages actively being processed per tenant subgroup) is less than the maximum message threshold (per tenant), then the buffer service 110 publishes the message to the work topics buffer 340, which is partitioned in any manner (e.g., by tenant), and increments the throttle count (i.e., increments the number of messages actively being processed by the tenant subgroup).

Micro-service B 350 connects to the work topics buffer 340. Connecting may be described as acquiring a connection to the work topics buffer 340. Micro-service B 350 polls the work topics buffer 340 periodically to determine whether there is a new message to be processed. If a new message is available, micro-service B 350 retrieves a message from the work topics buffer 340 and processes the message payload. Then, micro-service B 350 decrements the throttle count.

In certain embodiments, the cluster-wide cache 160 is periodically emptied to account for micro-services that did not decrement the throttle count. This results in unthrottled processing (for a brief period of time) until the cluster-wide cache 160 is re-built.

Figure 4A:
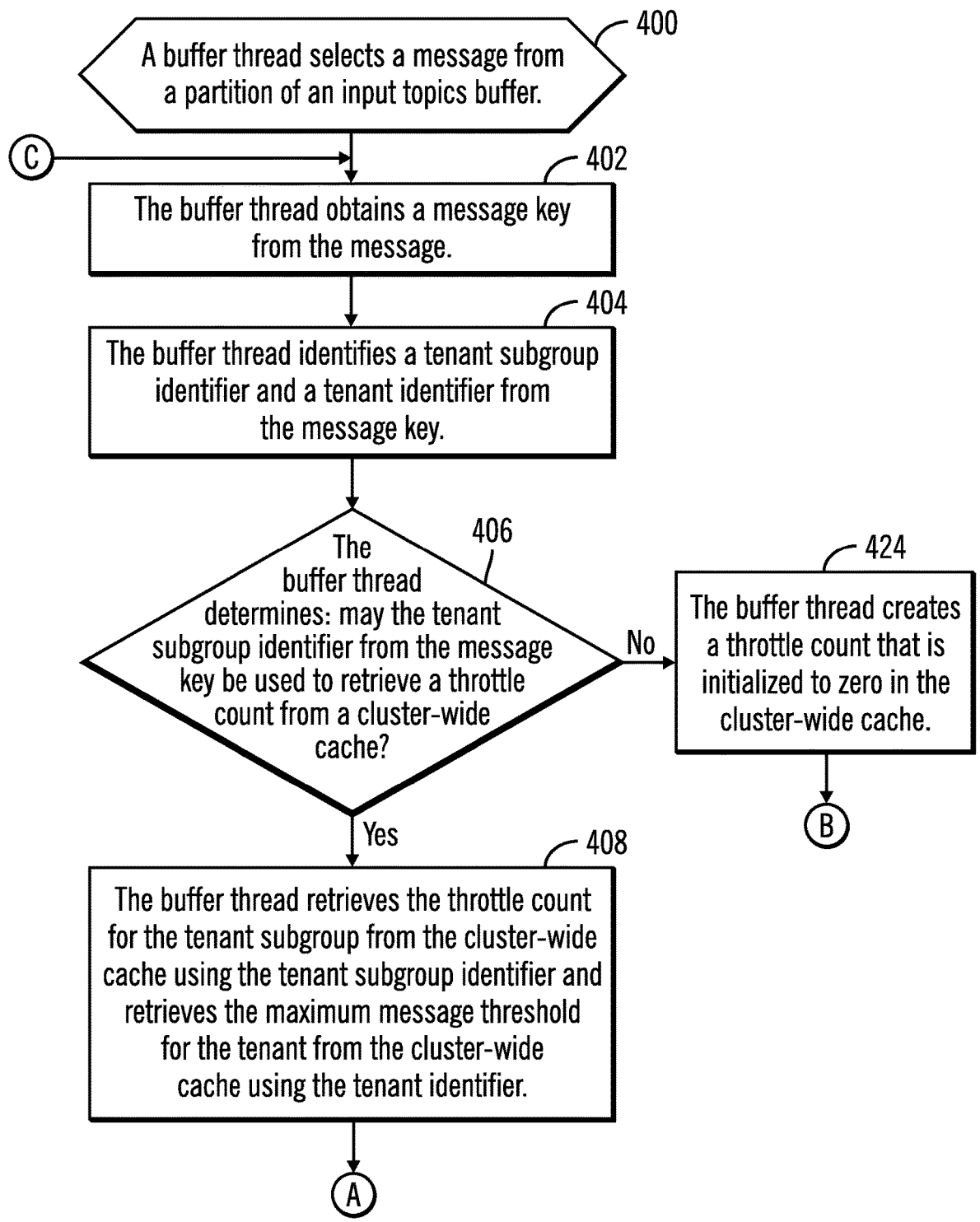
FIGS. 4A and 4B illustrate, in a flowchart, operations performed by the buffer service in accordance with certain embodiments.
Figure 4B:
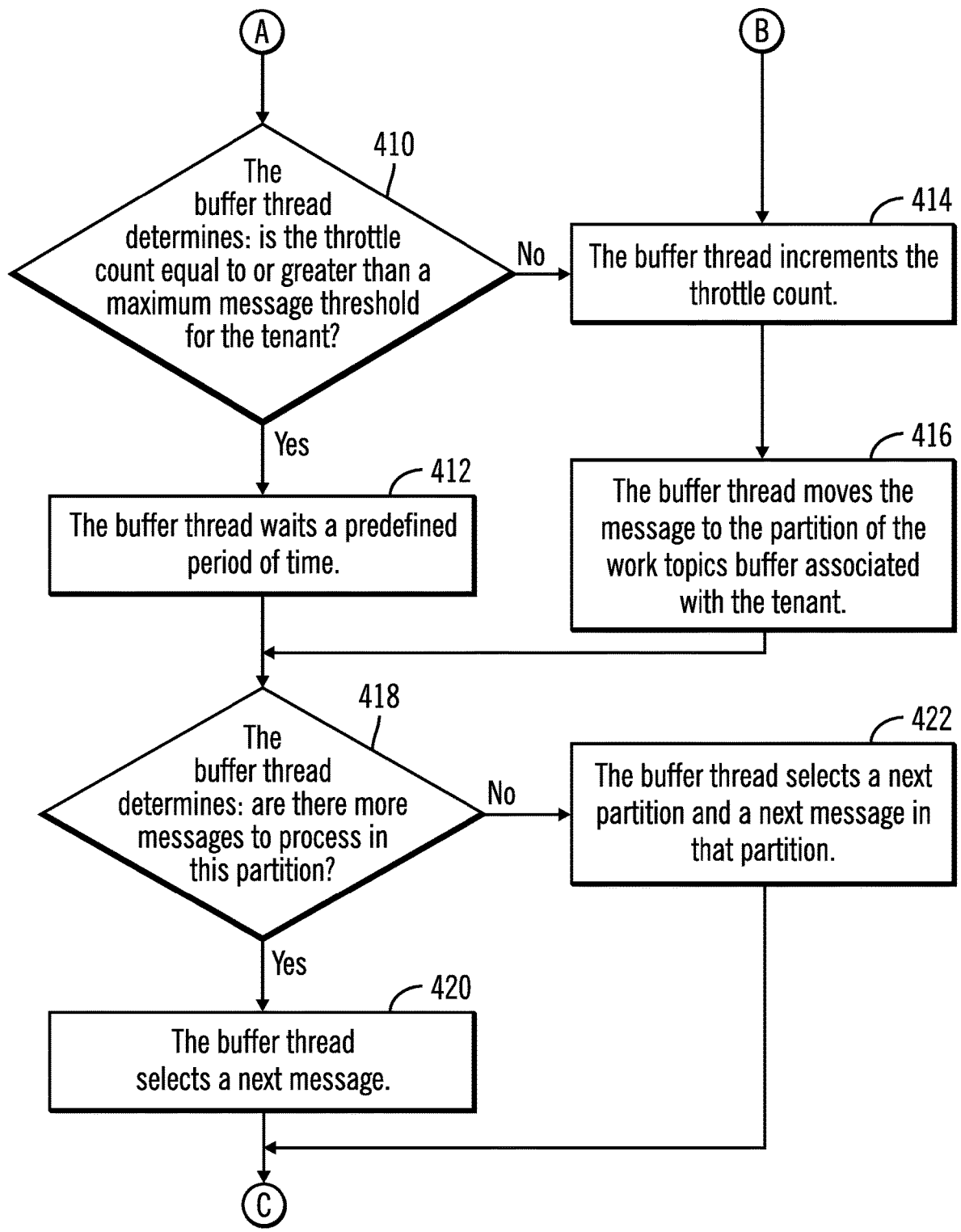

FIGS. 4A and 4B illustrate, in a flowchart, operations performed by a buffer thread 112 of the buffer service 110 in accordance with certain embodiments. Control begins at block 400 with the buffer thread 112 selecting a message from a partition of an input topics buffer 130. In certain embodiments, the buffer thread 112 polls the input topics buffer to determine that a message is available.

In block 402, the buffer thread 112 obtains a message key from the message. In certain embodiments, each message contains one message key. In block 404, the buffer thread 112 identifies a tenant subgroup identifier and a tenant identifier from the message key. In certain embodiments, the message key contains the tenant subgroup identifier, and the buffer thread 112 retrieves the tenant subgroup identifier from the message key and maps the tenant subgroup identifier to the tenant identifier.

In block 406, the buffer thread 112 determines whether the tenant subgroup identifier from the message key may be used to retrieve a throttle count from a cluster-wide cache (where the throttle count is stored for each tenant subgroup). If so, the throttle count has been found in the cluster-wide cache and processing continues to block 408, otherwise, the throttle count has not been created yet and processing continues to block 424.

In block 424, the buffer thread 112 creates a throttle count that is initialized to zero in the cluster-wide cache and processing continues to block 414 (FIG. 4B). This allows for the message to be sent to the work topics buffer when no throttle count was found, without comparing the throttle count to the maximum message threshold.

In block 408, the buffer thread 112 retrieves the throttle count for the tenant subgroup from the cluster-wide cache using the tenant subgroup identifier and retrieves the maximum message threshold for the tenant from the cluster-wide cache using the tenant identifier. From block 408 (FIG. 4A), processing continues to block 410 (FIG. 4B).

In block 410, the buffer thread 112 determines whether the throttle count (i.e., the number of messages actively being processed by the tenant subgroup) is equal to or greater than the maximum message threshold (for the tenant). If so, processing continues to block 412, otherwise, processing continues to block 414.

In block 412, the buffer thread 112 waits a pre-defined period of time and continues to block 418.

In block 414, the buffer thread 112 increments the throttle count. In block 416, the buffer thread 112 moves the message to the partition of the work topics buffer associated with the tenant and continues to block 418. That is, when the throttle count is less than the maximum message threshold, the message is removed from the input topics buffer and added to the work topics buffer.

In block 418, the buffer thread 112 determines whether there are more messages to process in the current partition. If so, processing continues to block 420, otherwise, processing continues to block 422.

In block 420, the buffer thread 112 selects a next message, and processing continues to block 402 (FIG. 4A). In block 422, the buffer thread 112 selects a next partition and a next message in that partition, and processing continues to block 402 (FIG. 4A). Thus, the buffer thread 112 processes messages in one partition before moving to messages in another partition.

Thus, in certain embodiments, the tenant is associated with multiple tenant subgroups and the maximum message threshold, while each of the multiple tenant subgroups is associated with a throttle count. When the number of active messages for a tenant subgroup of the tenant equals or exceeds the maximum message threshold for that tenant, that the tenant subgroup is throttled (i.e., messages for the tenant subgroup are not moved from the input topics buffer to the work topics buffer for processing by the micro-services). This allows for throttling at the tenant subgroup level, with messages from an individual tenant subgroup being throttled when the number of active messages for that tenant subgroup of the tenant equals or exceeds the maximum message threshold for that tenant.

However, in other embodiments, throttling occurs at the tenant level, with messages from each tenant subgroup of the tenant being throttled when the number of active messages for the tenant subgroups of the tenant equals or exceeds the maximum message threshold for that tenant. In this case, the throttle count may be associated with the tenant (rather than with the tenant subgroup), and, in the processing of block 410, the buffer thread 112 determines whether the throttle count (i.e., the number of messages actively being processed by the tenant subgroups of the tenant) is equal to or greater than the maximum message threshold (for the tenant).

Figure 5A:
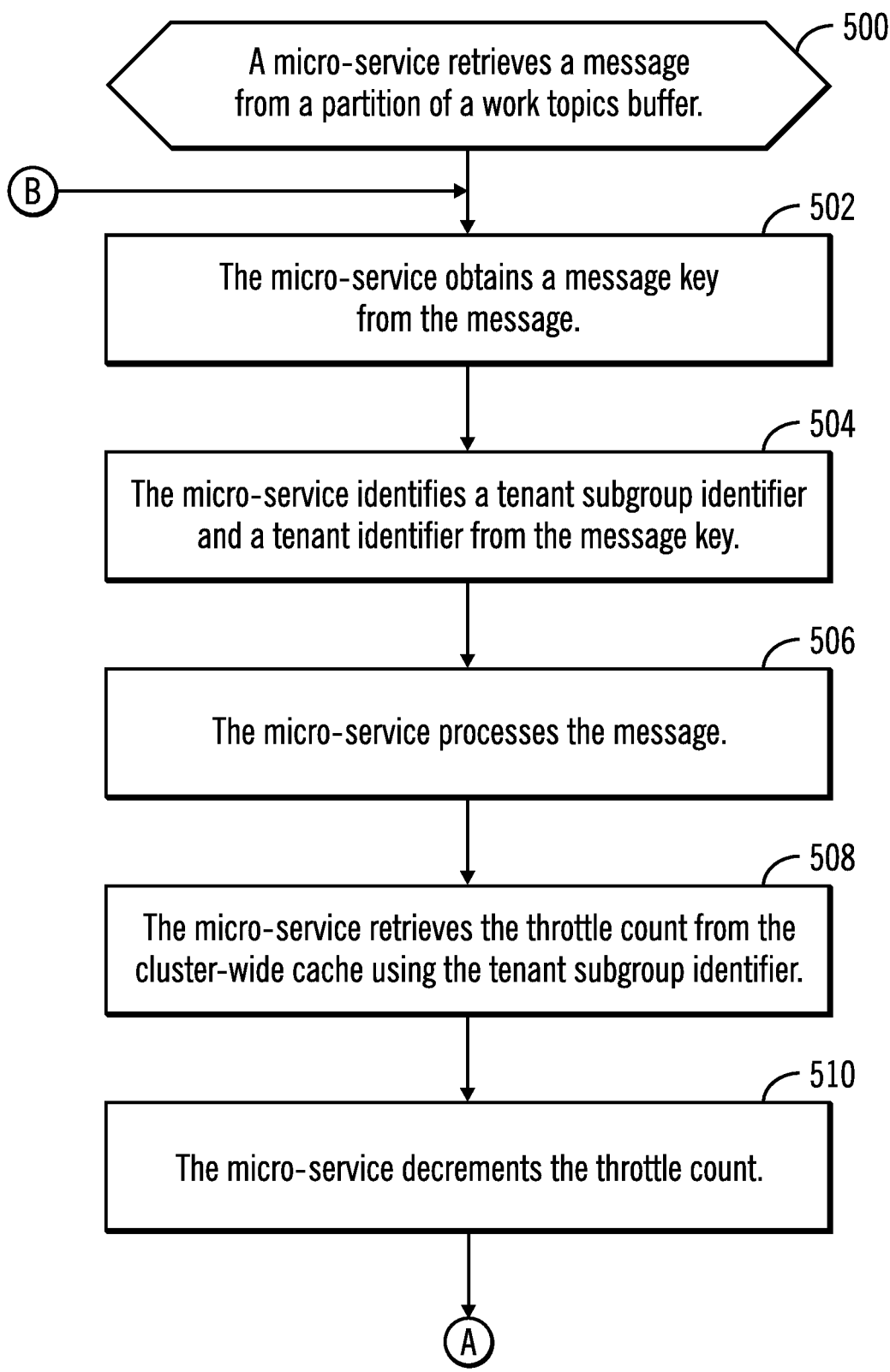
FIGS. 5A and 5B illustrate, in a flowchart, operations performed by a micro-service in accordance with certain embodiments.
Figure 5B:
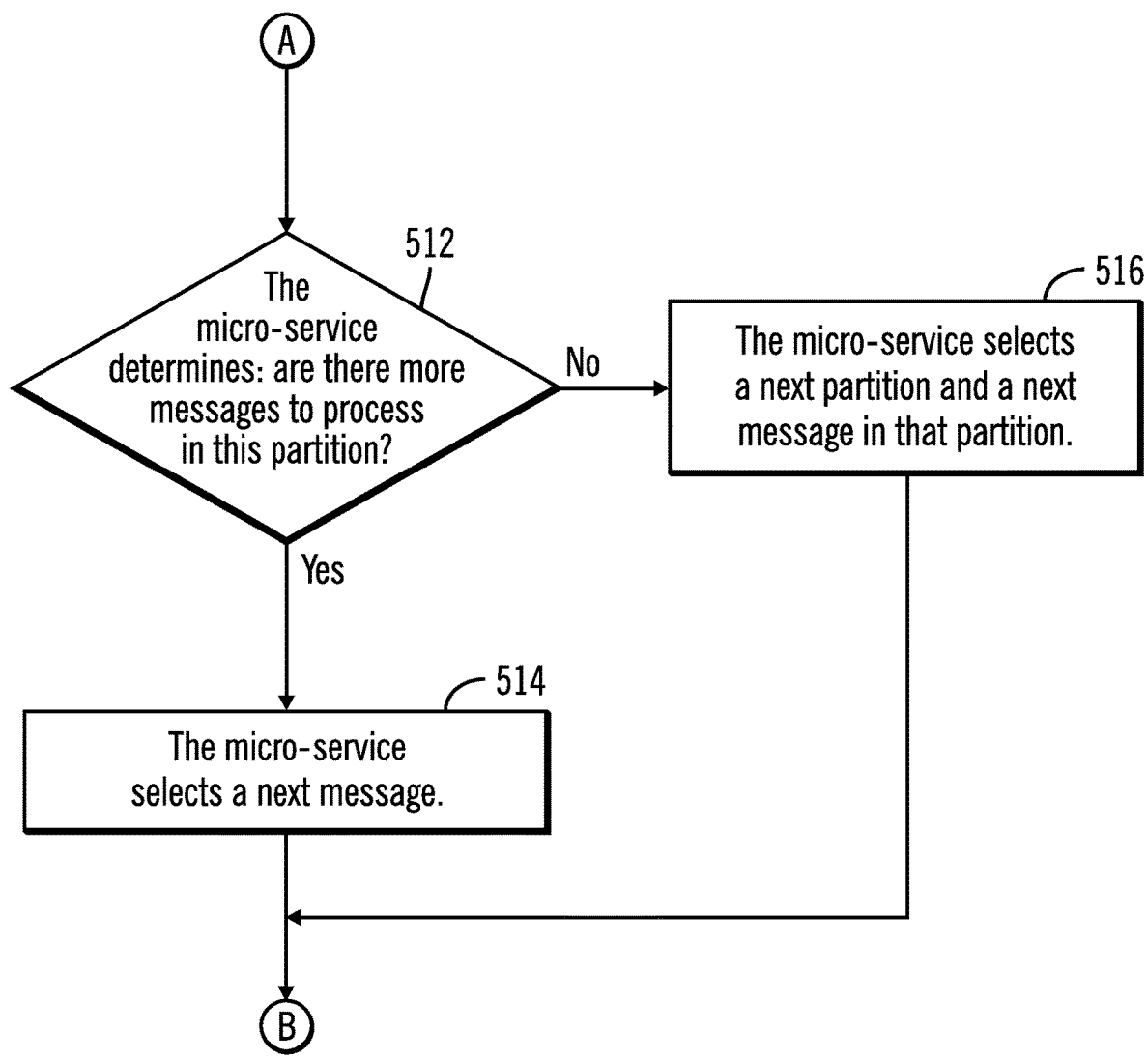

FIGS. 5A and 5B illustrate, in a flowchart, operations performed by a micro-service in accordance with certain embodiments. Control begins at block 500 with the micro-service retrieving a message from a partition of a work topics buffer.

In block 502, the micro-service obtains a message key from the message. In certain embodiments, each message contains one message key. In block 504, the micro-service identifies a tenant subgroup identifier and a tenant identifier from the message key. In certain embodiments, the message key contains the tenant subgroup identifier, and the micro-service retrieves the tenant subgroup identifier from the message key and maps the tenant subgroup identifier to the tenant identifier.

In block 506, the micro-service processes the message. In certain embodiments, the micro-service determines the processing (logic) to be performed based on the tenant subgroup identifier and/or the tenant identifier.

In block 508, the micro-service retrieves the throttle count for the tenant subgroup from the cluster-wide cache using the tenant subgroup identifier. In block 510, the micro-service decrements the throttle count and processing continues to block 512 (FIG. 5B).

In block 512, the micro-service determines whether there are more messages to process in the current partition. If so, processing continues to block 514, otherwise, processing continues to block 516.

In block 514, the micro-service selects a next message, and processing continues to block 502 (FIG. 5A). In block 514, the micro-service selects a next partition and a next message in that partition, and processing continues to block 502 (FIG. 5A). Thus, in certain embodiments, the micro-service processes messages in one partition before moving to messages in another partition.

Embodiments provide partitioning of data according to a tenant identification. Embodiments also implement a buffering service to sit between message producers (tenants and micro-services) and message consumers (the buffer service and micro-services). In combination with a cluster wide caching mechanism, the buffer service limits the number of incoming messages for a given tenant to the maximum message threshold (e.g., a maximum pre-configured value).

Embodiments keep track of a number of active messages being processed per tenant subgroup. When the number of active messages being processed for a given tenant meets or exceeds a configured threshold, the buffer service does not route any additional messages to the work topics buffer until work completes for processing the messages already in the work topics buffer.

In this manner, embodiments provide more control over the resources allocated to a given tenant at a given time across the entire cluster and at the micro-service level. This is beneficial for any cluster that has limited resources and may not be able to sufficiently scale.

Embodiments leave messages in the input topics buffer for a tenant if that tenant already has a number of active messages that exceeds a maximum message threshold. Thus, embodiments do not reject messages that have been throttled and do not move messages that have been throttled from one buffer to another buffer. If embodiments determine that the number of active messages has exceeded the maximum message threshold, embodiments simply leave a message where it is to be examined during the next iteration of the loop. With embodiments, the control modules (responsible for dequeue/enqueue in embodiments in which the input topics buffer and the work topics buffer are queues) are distributed across the cluster (per tenant, per micro-service), which is in line with the highly available micro-service architecture. With embodiments, multiple identical instances of both the producers and consumers may run simultaneously in the cluster to ensure that if one or more fail, there will still be others running for redundancy, thus achieving high availability.

With embodiments, a throttled micro-service is associated with an input topics message in the input topics buffer and a work topics message (or "output topics message") in the work topics buffer. The buffer service reads off of the input topics buffer and writes to the work topics buffer.

In certain embodiments, the input topics buffer is partitioned by the tenant subgroup, and the buffer service and the micro-service associate the message key of the message with the appropriate tenant identifier of the tenant. The message key specifies the tenant subgroup identifier.

In certain embodiments, the buffer service retrieves a message key of a message, obtains a tenant identifier, and uses the tenant identifier to retrieve a corresponding throttle count from the cluster-wide cache for the tenant subgroup. If there is no throttle count, then the buffer service assumes that the message is un-throttled and sends the message directly to the work topics buffer. Otherwise, the buffer service compares the throttle count with the maximum message threshold. The maximum message threshold is across nodes and across the cluster.

If the throttle count exceeds the maximum message threshold, then the buffer service skips that message and does not send the message to the micro-service via the work topics buffer.

In certain embodiments, the consumer (buffer service) handling a message does not commit the message in the input topics buffer, and so the same message is re-read later. In certain embodiments, committing the message includes updating an offset to the input topics buffer, so, when the offset is not updated, the same message is read later. In certain embodiments, the consumer (buffer service) reads a message from a partition, and reads the next message from a next partition, thus, moving through messages and partitions. If the message is committed, the message is sent to work topics buffer for processing by the micro service.

In certain embodiments, the micro-service processes the message in a typical manner, unaware of the buffer service throttling some messages.

In certain embodiments, after a response message is sent by the micro-service to the input topics buffer or after all processing of a message is complete, the message key is used to obtain the tenant identifier and look up the appropriate throttle count in the cluster-wide cache, and the number of active messages is decremented by one ("1"), unless the number of active messages is already zero ("0").

An Enterprise Service Bus (ESB) may be described as tool used to distribute work among connected, interacting components of an application and to enable communication between these connected, interacting components. ESBs may be used by cloud service providers. ESBs offer applications the ability to connect to the ESB and subscribe to receive messages based on rules. ESBs may be implemented using queuing frameworks. Embodiments allow queueing frameworks utilizing ESBs to offer native capability for throttling message processing based on tenant.

In certain embodiments, the cloud infrastructure includes multiple buffer services, and each of the buffer services is provided for one of the micro-services, along with the input topics buffer and the work topics buffer. In other embodiments, one buffer service is provided for any grouping of micro-services.

Embodiments provide buffer services for messages to a cloud processing micro-service from message producers who provide a message key with a tenant subgroup identifier and a message payload in a message. The tenant subgroup may be described as a cloud service user. The input topics buffers are partitioned to portions for respective tenant subgroups. A message for a certain tenant and a certain micro-service, when received, is stored with the message's message key and tenant subgroup identifier in the input topics buffer for that certain micro-service within the partition for the certain tenant.

The buffer service keeps track of how many active messages are being processed per tenant and per micro-service, such that when the amount of messages being processed for a given tenant meets or exceeds a maximum message threshold, the buffer service will not route any additional messages to the work topics buffer for the micro-service until the current, active work completes.

When processing the message in the input topics buffer, the buffer service for the micro-service looks up the throttle count for the message in a cluster-wide cache and, if the buffer service determines that the message is un-throttled (via finding no throttle count), the buffer service sends the message directly to the work topics buffer for the micro-service. The micro-service processes messages in the work topics buffer as it would normally, unaware of the new input topics buffer and the buffer service provided by embodiments.

If the buffer service determines that the message is throttled (via finding a throttle count), the buffer service determines whether the number of messages being processed meets or exceeds a maximum threshold across nodes of the cluster. If not exceeded, the buffer service sends the message to the work topics buffer for the micro-service. Again, micro-service processes messages in the work topics buffer as it would normally, unaware of the new input topics buffer and the buffer service provided by embodiments. If exceeded, the buffer service skips the message (leaving the message uncommitted in the input topics buffer) for later processing. Then, the buffer service goes to the next partition by reading the tenant subgroup identifier of the next message in the input topics buffer, and using the tenant subgroup identifier to proceed to the input topics buffer partition for incoming message processing for the micro-service.

Figure 6:
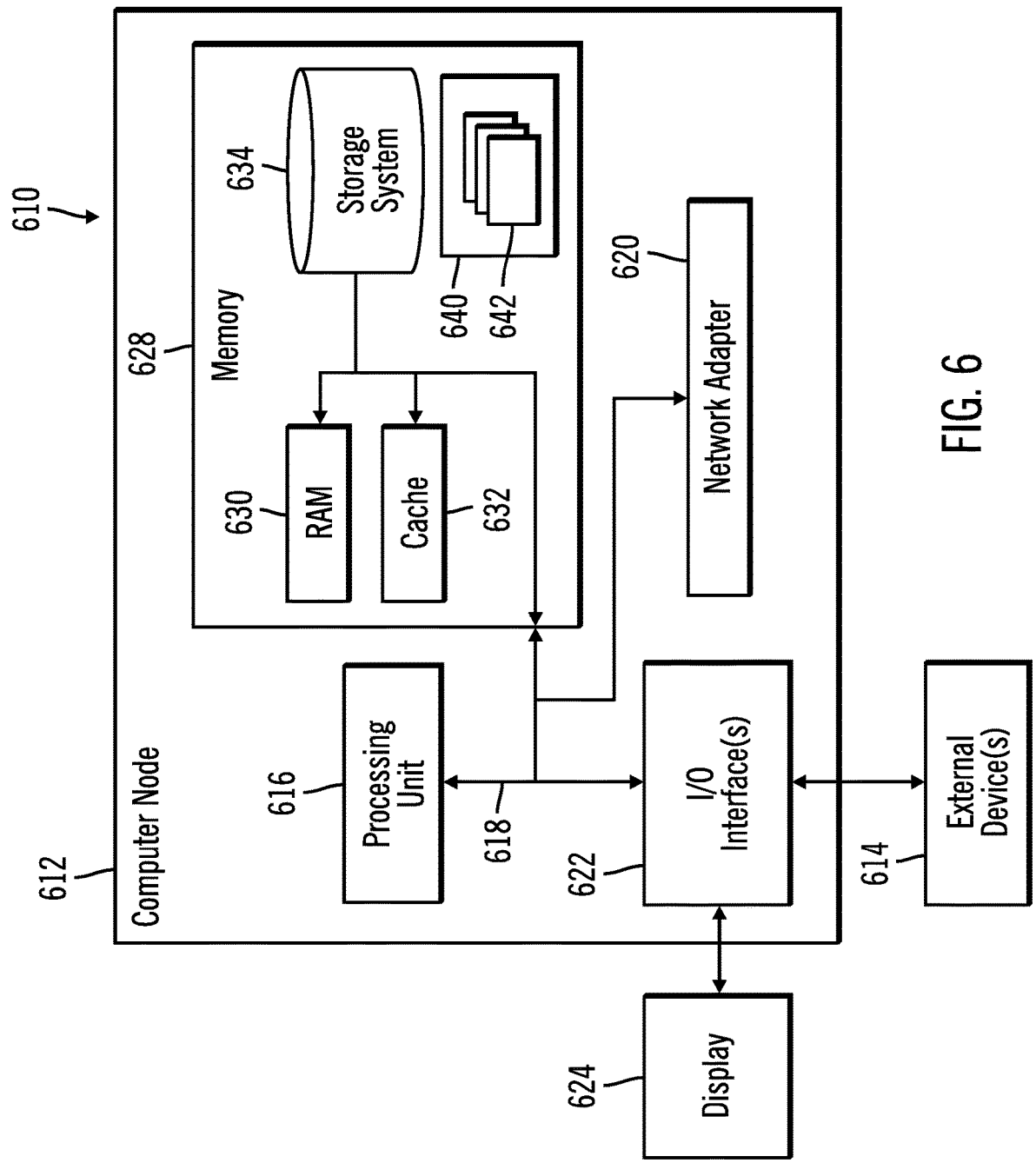
FIG. 6 illustrates a computing node in accordance with certain embodiments.

FIG. 6 illustrates a computing environment 610 in accordance with certain embodiments. In certain embodiments, the computing environment is a cloud computing environment. Referring to FIG. 6, computer node 612 is only one example of a suitable computing node and is not intended to suggest any limitation as to the scope of use or functionality of embodiments of the invention described herein. Regardless, computer node 612 is capable of being implemented and/or performing any of the functionality set forth hereinabove.

The computer node 612 may be a computer system, which is operational with numerous other general purpose or special purpose computing system environments or configurations. Examples of well-known computing systems, environments, and/or configurations that may be suitable for use with computer node 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer node 612 may be described in the general context of computer system executable instructions, such as program modules, being executed by a computer system. Generally, program modules may include routines, programs, objects, components, logic, data structures, and so on that perform particular tasks or implement particular abstract data types. Computer node 612 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer node 612 is shown in the form of a general-purpose computing device. The components of computer node 612 may include, but are not limited to, one or more processors or processing units 616, a system memory 628, and a bus 618 that couples various system components including system memory 628 to one or more processors or processing units 616.

Bus 618 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer node 612 typically includes a variety of computer system readable media. Such media may be any available media that is accessible by computer node 612, and it includes both volatile and non-volatile media, removable and non-removable media.

System memory 628 can include computer system readable media in the form of volatile memory, such as random access memory (RAM) 630 and/or cache memory 632. Computer node 612 may further include other removable/non-removable, volatile/non-volatile computer system storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 618 by one or more data media interfaces. As will be further depicted and described below, system memory 628 may include at least one program product having a set (e.g., at least one) of program modules that are configured to carry out the functions of embodiments of the invention.

Program/utility 640, having a set (at least one) of program modules 642, may be stored in system memory 628 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of embodiments of the invention as described herein.

Computer node 612 may also communicate with one or more external devices 614 such as a keyboard, a pointing device, a display 624, etc.; one or more devices that enable a user to interact with computer node 612; and/or any devices (e.g., network card, modem, etc.) that enable computer node 612 to communicate with one or more other computing devices. Such communication can occur via Input/Output (I/O) interfaces 622. Still yet, computer node 612 can communicate with one or more networks such as a local area network (LAN), a general wide area network (WAN), and/or a public network (e.g., the Internet) via network adapter 620. As depicted, network adapter 620 communicates with the other components of computer node 612 via bus 618. It should be understood that although not shown, other hardware and/or software components could be used in conjunction with computer node 612. Examples, include, but are not limited to: microcode, device drivers, redundant processing units, external disk drive arrays, RAID systems, tape drives, and data archival storage systems, etc.

In certain embodiments, the cluster 105 and/or each tenant computing device 170a ... 170n has the architecture of computer node 512. In certain embodiments, the cluster 105 and/or each tenant computing device 170a ... 170n are part of a cloud infrastructure. In certain alternative embodiments, the cluster 105 and/or each tenant computing device 170a ... 170n are not part of a cloud infrastructure.

Cloud Embodiments

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
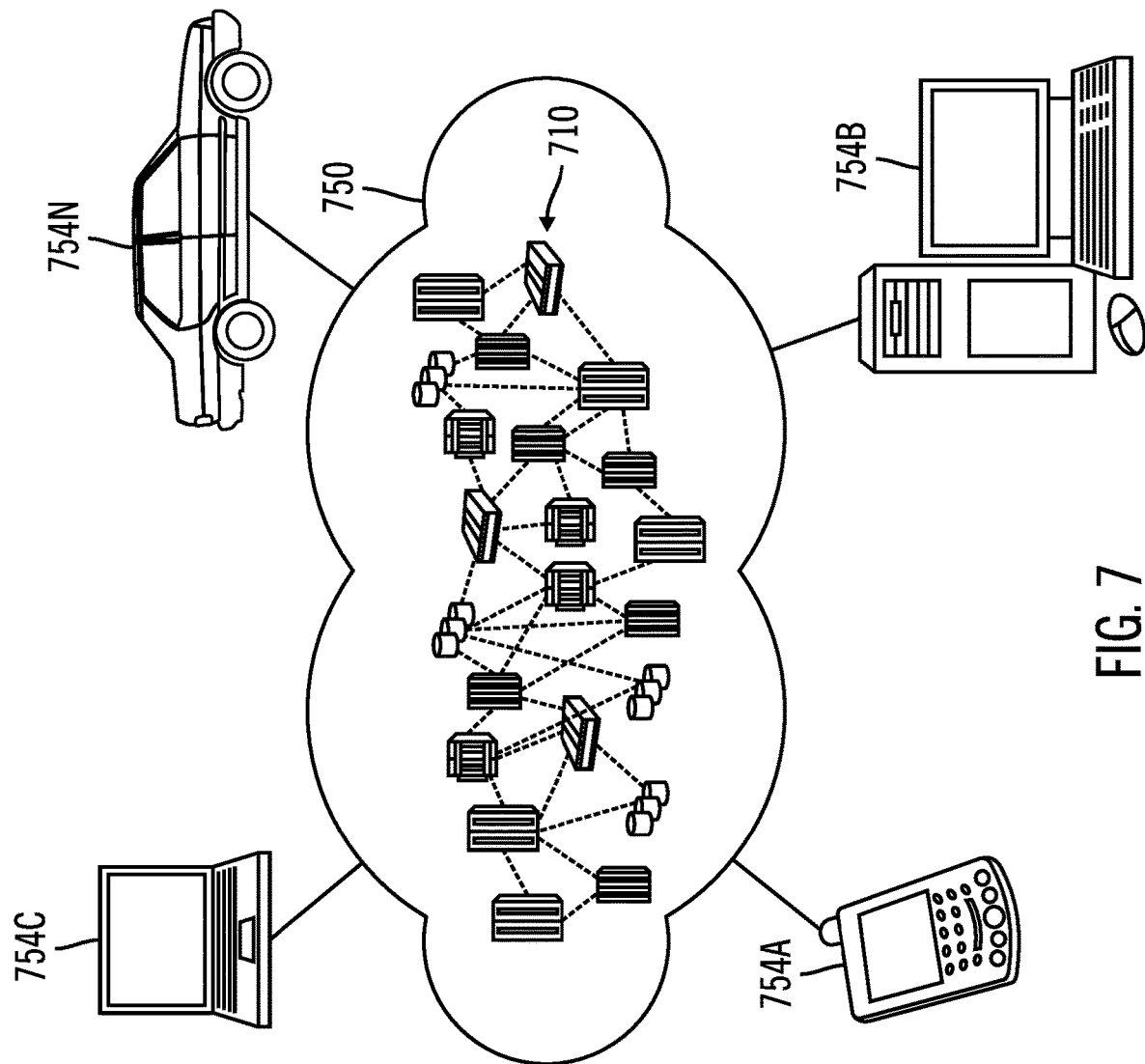
FIG. 7 illustrates a cloud computing environment in accordance with certain embodiments.

Referring now to FIG. 7, illustrative cloud computing environment 720 is depicted. As shown, cloud computing environment 720 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 720 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 720 can communicate with any type of computerized device over any type of network and/or network addressable connection (e.g., using a web browser).

Figure 8:
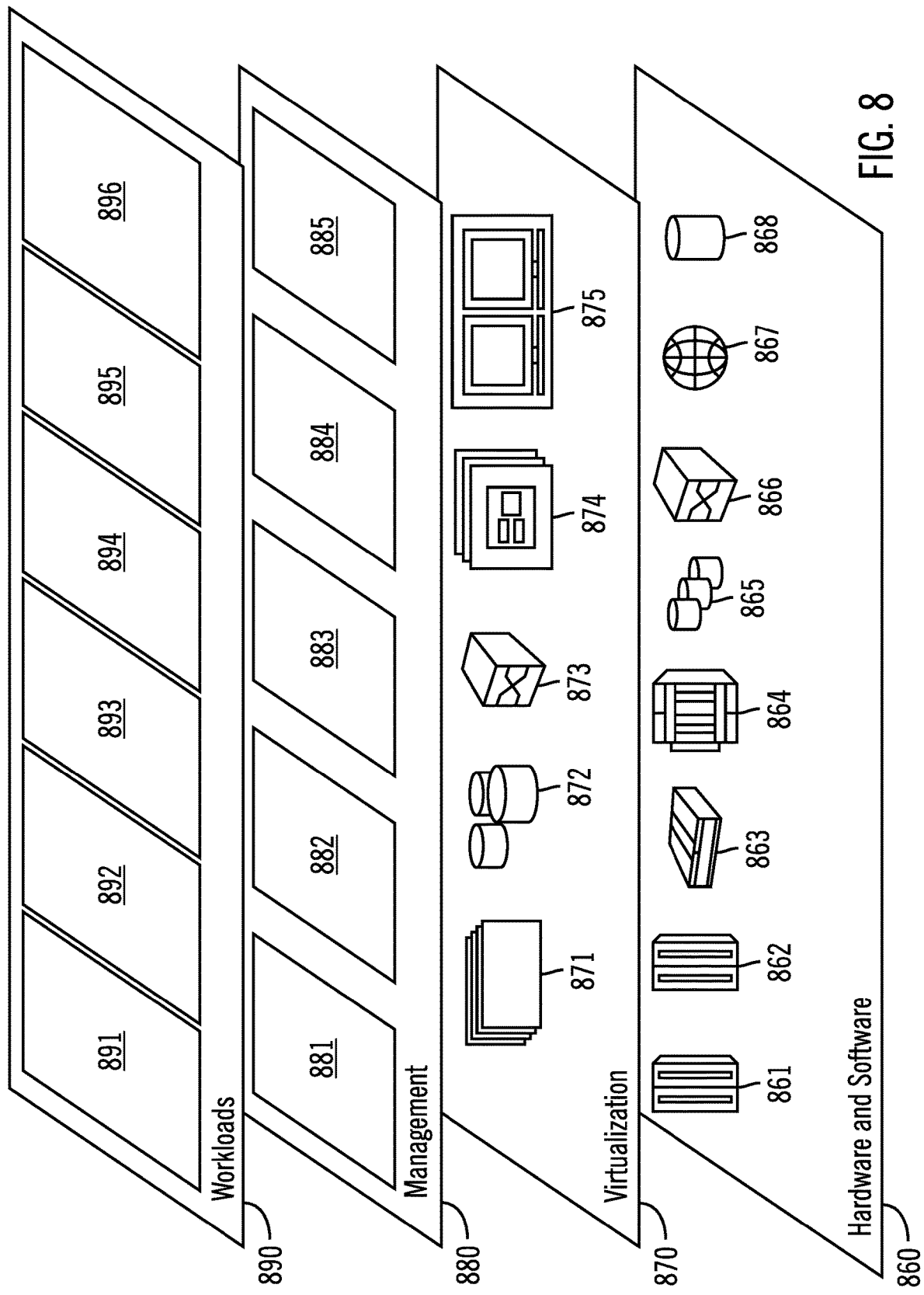
FIG. 8 illustrates abstraction model layers in accordance with certain embodiments.

Referring now to FIG. 8, a set of functional abstraction layers provided by cloud computing environment 720 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and throttling using message partitioning and buffering 896.

Thus, in certain embodiments, software or a program, implementing throttling using message partitioning and buffering in accordance with embodiments described herein, is provided as a service in a cloud environment.

Additional Embodiment Details

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, embodiments of the invention reside in the claims herein after appended. The foregoing description provides examples of embodiments of the invention, and variations and substitutions may be made in other embodiments.

What is claimed is:

1. A computer-implemented method, comprising operations for:

storing a plurality of messages in an input topics buffer, wherein the input topics buffer is stored in a plurality of partitions, and wherein each of the partitions of the plurality of partitions is associated with a tenant subgroup of a plurality of tenant subgroups of a tenant of a plurality of tenants;

selecting a message of the plurality of messages from the input topics buffer for a first tenant subgroup of the tenant;

retrieving a tenant subgroup identifier of the first tenant subgroup from a message key of the message;

mapping the tenant subgroup identifier to a tenant identifier of the tenant;

retrieving, using the tenant subgroup identifier, a throttle count for the first tenant subgroup from a cluster-wide cache that stores a plurality of different throttle counts, wherein each of the different throttle counts is associated with different tenant subgroup of the plurality of tenant subgroups, and wherein a second tenant subgroup has another throttle count;

retrieving, using the tenant identifier, a maximum message threshold for the tenant, wherein the maximum message threshold is used for each tenant subgroup of the plurality of tenant subgroups;

in response to determining that the throttle count for the first tenant subgroup is less than the maximum message threshold, moving the message from the input topics buffer to a work topics buffer; and in response to determining that the throttle count for the first tenant subgroup is equal to or greater than the maximum message threshold, throttling the tenant subgroup.

2. The computer-implemented method of claim 1, wherein messages in a first partition of the plurality of partitions are processed in an order received before messages in a next partition of the plurality of partitions are processed in the order received.

3. The computer-implemented method of claim 1, wherein the operations further comprise:
incrementing the throttle count.

4. The computer-implemented method of claim 1, wherein a micro-service retrieves the message from the work topics buffer, processes the message, and decrements the throttle count.

5. The computer-implemented method of claim 1, wherein a Software as a Service (SaaS) is configured to perform the operations of the method.

6. A computer program product, the computer program product comprising a computer readable storage medium having program code embodied therewith, the program code executable by at least one processor to perform operations for:
storing a plurality of messages in an input topics buffer, wherein the input topics buffer is stored in a plurality of partitions, and wherein each of the partitions of the plurality of partitions is associated with a tenant subgroup of a plurality of tenant subgroups of a tenant of a plurality of tenants;
selecting a message of the plurality of messages from the input topics buffer for a first tenant subgroup of the tenant;
retrieving a tenant subgroup identifier of the first tenant subgroup from a message key of the message;
mapping the tenant subgroup identifier to a tenant identifier of the tenant;
retrieving, using the tenant subgroup identifier, a throttle count for the first tenant subgroup from a cluster-wide cache that stores a plurality of different throttle counts, wherein each of the different throttle counts is associated with different tenant subgroup of the plurality of tenant subgroups, and wherein a second tenant subgroup has another throttle count;
retrieving, using the tenant identifier, a maximum message threshold for the tenant, wherein the maximum message threshold is used for each tenant subgroup of the plurality of tenant subgroups;
in response to determining that the throttle count for the first tenant subgroup is less than the maximum message threshold, moving the message from the input topics buffer to a work topics buffer; and
in response to determining that the throttle count for the first tenant subgroup is equal to or greater than the maximum message threshold, throttling the tenant subgroup.

7. The computer program product of claim 6, wherein messages in a first partition of the plurality of partitions are processed in an order received before messages in a next partition of the plurality of partitions are processed in the order received.

8. The computer program product of claim 6, wherein the operations further comprise:
incrementing the throttle count.

9. The computer program product of claim 6, wherein a micro-service retrieves the message from the work topics buffer, processes the message, and decrements the throttle count.

10. The computer program product of claim 6, wherein a Software as a Service (SaaS) is configured to perform the operations of the computer program product.

11. A computer system, comprising:
one or more processors, one or more computer-readable memories and one or more computer-readable, tangible storage devices; and
program instructions, stored on at least one of the one or more computer-readable, tangible storage devices for execution by at least one of the one or more processors via at least one of the one or more computer-readable memories, to perform operations comprising:
storing a plurality of messages in an input topics buffer, wherein the input topics buffer is stored in a plurality of partitions, and wherein each of the partitions of the plurality of partitions is associated with a tenant subgroup of a plurality of tenant subgroups of a tenant of a plurality of tenants;
selecting a message of the plurality of messages from the input topics buffer for a first tenant subgroup of the tenant;
retrieving a tenant subgroup identifier of the first tenant subgroup from a message key of the message;
mapping the tenant subgroup identifier to a tenant identifier of the tenant;
retrieving, using the tenant subgroup identifier, a throttle count for the first tenant subgroup from a cluster-wide cache that stores a plurality of different throttle counts, wherein each of the different throttle counts is associated with different tenant subgroup of the plurality of tenant subgroups, and wherein a second tenant subgroup has another throttle count;
retrieving, using the tenant identifier, a maximum message threshold for the tenant, wherein the maximum message threshold is used for each tenant subgroup of the plurality of tenant subgroups;
in response to determining that the throttle count for the first tenant subgroup is less than the maximum message threshold, moving the message from the input topics buffer to a work topics buffer; and
in response to determining that the throttle count for the first tenant subgroup is equal to or greater than the maximum message threshold, throttling the tenant subgroup.

12. The computer system of claim 11, wherein messages in a first partition of the plurality of partitions are processed in an order received before messages in a next partition of the plurality of partitions are processed in the order received.

13. The computer system of claim 11, wherein the operations further comprise:
incrementing the throttle count.

14. The computer system of claim 11, wherein a micro-service retrieves the message from the work topics buffer, processes the message, and decrements the throttle count.

15. The computer system of claim 11, wherein a Software as a Service (SaaS) is configured to perform the operations of the computer system.

* * * * *